United States Patent
Hauhia et al.

(10) Patent No.: US 7,058,542 B2
(45) Date of Patent: Jun. 6, 2006

(54) WIRELESS DIAGNOSTIC SYSTEM IN INDUSTRIAL PROCESSES

(75) Inventors: Markus Hauhia, Shanghai (CN); Mika Kreivi, Vantaa (FI); Jouni Pyötsiä, Helsinki (FI)

(73) Assignee: Metso Automation Oy, Helsinki (FI)

( * ) Notice: Subject to any disclaimer, the term of this patent is extended or adjusted under 35 U.S.C. 154(b) by 393 days.

(21) Appl. No.: 10/332,165

(22) PCT Filed: Jul. 4, 2001

(86) PCT No.: PCT/FI01/00639

§ 371 (c)(1),
(2), (4) Date: Jun. 13, 2003

(87) PCT Pub. No.: WO02/05199

PCT Pub. Date: Jan. 17, 2002

(65) Prior Publication Data

US 2003/0236579 A1    Dec. 25, 2003

(30) Foreign Application Priority Data

Jul. 7, 2000    (FI) .................................. 20001625

(51) Int. Cl.
*G21C 17/00* (2006.01)

(52) U.S. Cl. ........................ 702/183; 702/182
(58) Field of Classification Search ................ 702/183
See application file for complete search history.

(56) References Cited

U.S. PATENT DOCUMENTS

| 5,481,481 | A | 1/1996 | Frey et al. |
| 5,801,940 | A | 9/1998 | Russ et al. |
| 6,330,525 | B1 * | 12/2001 | Hays et al. .................. 702/183 |
| 6,839,660 | B1 * | 1/2005 | Eryurek et al. ............. 702/188 |

FOREIGN PATENT DOCUMENTS

WO    WO-00/33049    6/2000

OTHER PUBLICATIONS

Copy of Official Action for Finnish Priority Appl. No. 2001625 dated Mar. 13, 2001.
Copy of International Search Report for PCT/FI/00639 completed Oct. 12, 2001.

* cited by examiner

*Primary Examiner*—Carol S. W. Tsai
(74) *Attorney, Agent, or Firm*—Alston & Bird LLP

(57) ABSTRACT

The invention relates to device diagnostics in industrial processes comprising field devices employing a field bus. A remote diagnostics device (1) is placed in connection with a process device (2), separate from the field devices and the field bus. The remote diagnostics device comprises diagnostics electronics which collects diagnostics data relating to the process device, and a transmitter part for wireless (17) transmission of the diagnostics data to a near-by field device. The field device comprises a receiver part (41) for wireless (17) reception of the diagnostics data from said remote diagnostics device (1). A field device control unit (430) analyses the received diagnostics data and transmits a diagnostics report over a field bus interface (44) and the field bus to a diagnostics computer.

15 Claims, 2 Drawing Sheets

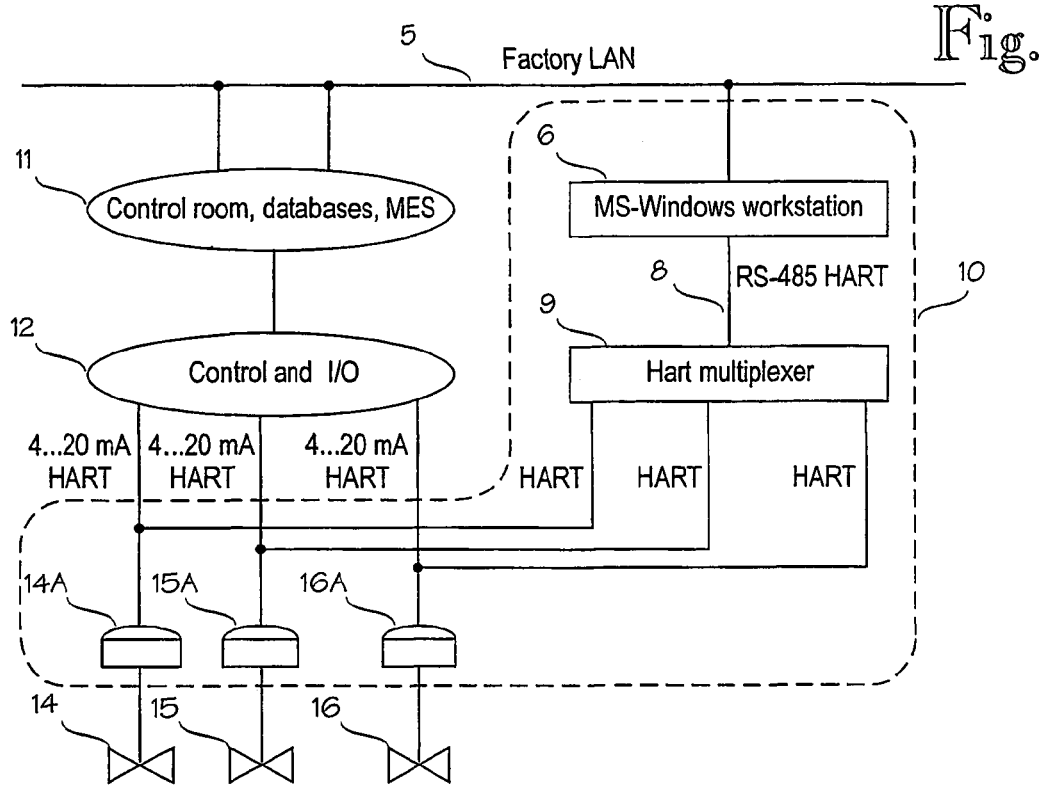
Fig. 1
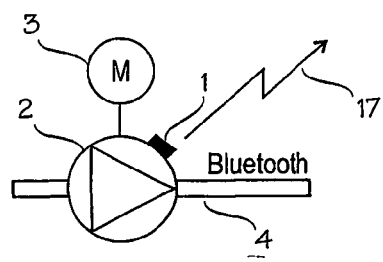
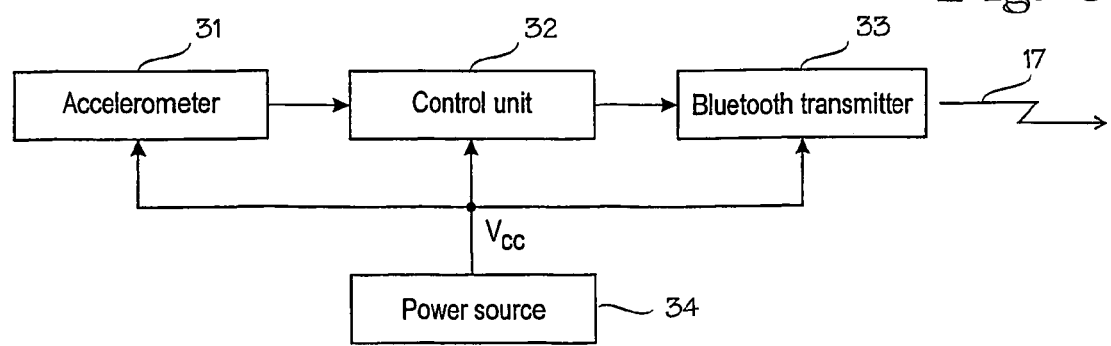
Fig. 3

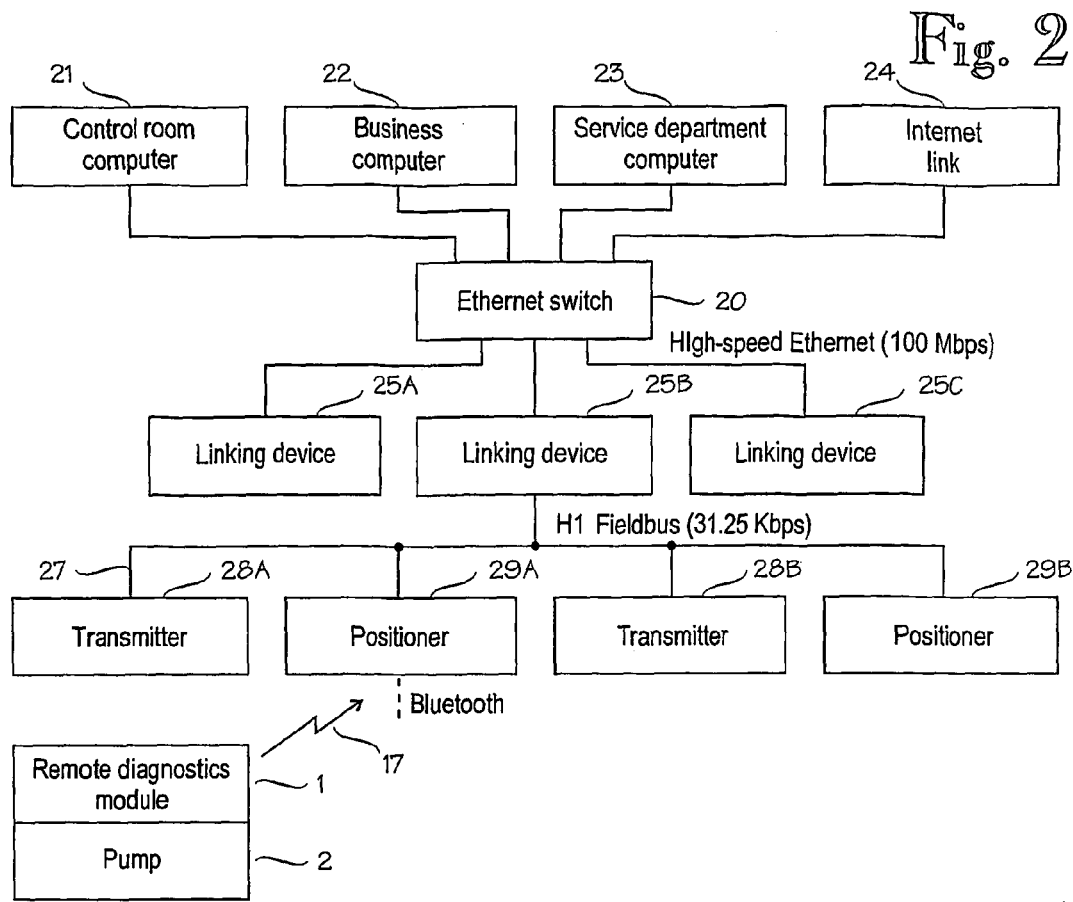
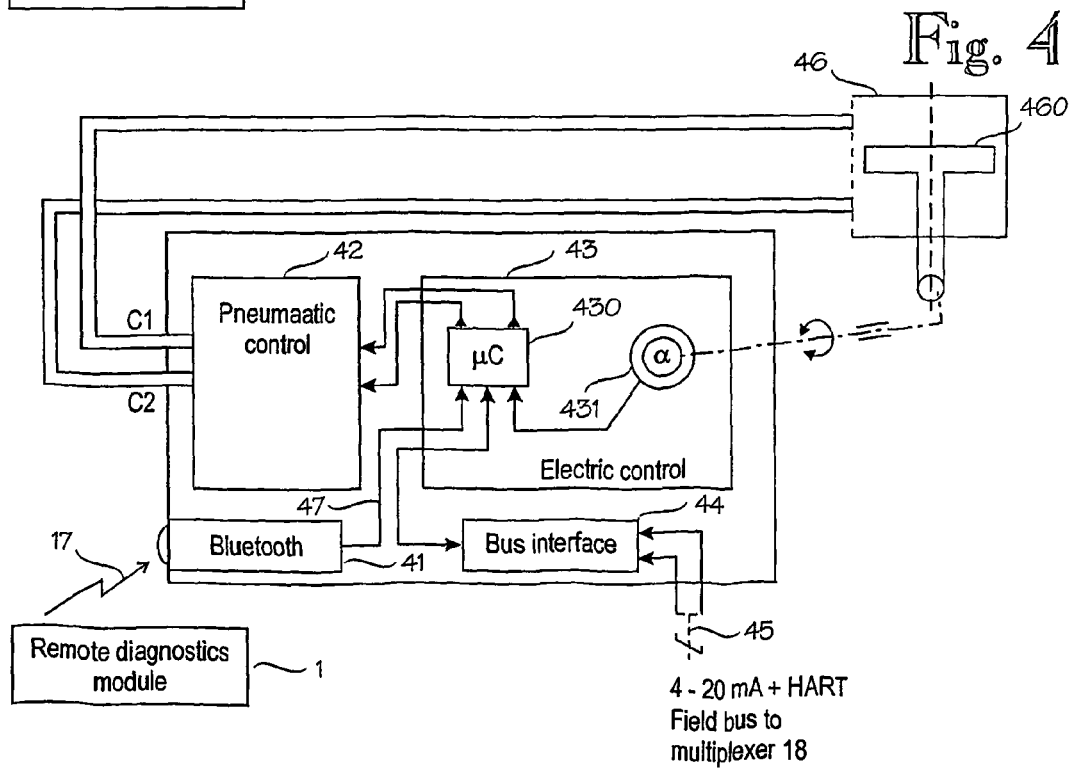

WIRELESS DIAGNOSTIC SYSTEM IN INDUSTRIAL PROCESSES

FIELD OF THE INVENTION

The invention relates to device diagnostics applied to industrial processes in general and particularly to process control systems and to management systems of field devices employing a field bus.

BACKGROUND OF THE INVENTION

Process control systems control industrial processes by means of various field devices connected to the process, such as regulating devices, control devices, transducers, transmitters, and the like. A typical field device is a control valve provided with a valve controller, such as the valve controller ND800 of Neles Automation. Devices known as intelligent field devices are equipped with control logic or software which allow for local control of the field device by means of a suitable control algorithm, for example, collection of both status and measurement data, and communication with an automation system or a specific field device management system by means of a field communication protocol, such as HART (Highway Addressable Remove Transducer). In addition, current intelligent field devices already comprise a sufficient amount of diagnostics to allow the field device to indicate when it malfunctions. This information can be utilized for focusing maintenance operations, which reduces unnecessary equipment testing and, thereby, the costs of maintenance. In addition, the utilization ratio of the plant (factory) increases as unpredictable down time is reduced.

A typical automation system comprises a control room with computers, databases, process control programs and user interfaces. There are various alternative ways to provide a connection between field devices and the rest of the system. Field devices are conventionally connected to the control system by two-wire twisted pair loops, each device being connected to the control system by a single twisted pair producing an analog 4 to 20 mA input signal. A process controller (PID) is arranged into a centralized computer system located in the control room. This type of process control system is often referred to as Direct Digital Control (DDC). In the next phase of control system evolution, a Distributed Control System (DCS) will be used, in which the process controllers (PID) are decentralized into a plural number of computers at the plant. The decentralized computers and the central computer located in the control room may be interconnected through a local data network or data bus, for example, whereas separate field devices remain connected to the process controllers through two-wire twisted pairs. Recently, new solutions have been adopted for the control systems, such as the Highway Addressable Remote Transducer (HART) protocol which allows digital data and a conventional analog 4 to 20 mA signal to be transmitted together in a twisted-pair loop. The most recent development phase involves a Field Control System (FCS) which employs a high-speed digital network or data bus for interconnecting the control room computer and the field devices. Conventional analog 4 to 20 mA signals have been omitted from the FCS, and a new communication protocol, commonly referred to as Fiedlbus, has been defined by the Instruments Society of America (ISA).

In principle, a field bus can be connected to any process device, thus allowing the devices to report their self-diagnostic data over the field bus to a maintenance computer, for example. However, all process devices do not support bus interfacing and self-diagnostic. For example, it has often not been necessary to connect devices such as pumps, mixers, refiners, screens, drums and switches to the field bus, although in some cases it would be useful to also monitor the diagnostics data of these devices in order to obtain timely information about their servicing needs, for example. To provide field bus cabling for these devices solely for this purpose would, however, often be a too high cost factor. Field bus cabling of dozens of meters to a device that is in a more remote location at the plant and the related mounting works may incur costs of thousands of dollars. In addition, in order for the device to be connected to and communicate with the field bus, it needs to be provided with I/O electronics. For example, Fieldbus typically requires a 16-bit processor and the related external electronics. The interface electronics involved also adds to costs considerably.

U.S. Pat. No. 5,793,963 teaches a control system comprising field devices which are connected to the control room with a Fieldbus cabling. In addition, some of the field devices are provided with a wireless Fieldbus gate through which a field device can be controlled over a wireless link using a portable control device or a workstation. The field device is thus provided with both a wireless and wired Fieldbus. The function of this wireless connection is to serve as a secondary, redundant control path, instead of a redundant, hardwired bus and to enable the field devices to be controlled directly by the service personnel using portable devices. This allows double cabling to be avoided. The wireless Fieldbus gate can use common interface electronics with the wired bus interface, and power supply to the field device can also be provided through the wired fieldbus.

The use of the described wireless Fieldbus gate without a wired Fieldbus would remove the above-mentioned cabling problem in diagnostics applications. Along with the cabling, also power supply to the interface and diagnostics electronics would be disposed of, and therefore power supply would have to be arranged locally. The power consumption of interface electronics is particularly high. But even if it were possible to arrange the power supply, the diagnostics and bus interface electronics would raise the price of the diagnostics unit to a considerably high level. The price would be too high in a case of several process devices, even though it would otherwise be interesting to automate their diagnosing.

A SUMMARY OF THE INVENTION

It is an object of the present invention to provide an affordable and simple solution for process device diagnostics in a field bus environment.

This is achieved with a system according to claim 1, a field device according to claim 7, and a diagnostics device according to claim 14.

An underlying idea of the invention is that the process device to be monitored is provided with a simple remote diagnostics device incorporating primarily only the electronics and transducers needed for collecting diagnostics data, and a transmitter part allowing for a short-range transfer of the diagnostics data with simple and inexpensive wireless transfer technology. In the vicinity (within said short range) of the process device to be monitored at the plant, such as a factory, there is provided an intelligent field device connected to a wired field bus, the field device being provided with a receiver allowing the diagnostics data transmitted by the remote diagnostics device to be received. This intelligent field device is, for example, a valve controller used for controlling a valve at the point in question. The field device comprises the necessary intelligence for controlling the valve and for field bus communication, as well as a field bus interface. In the invention, this capacity is also used for receiving diagnostics data from the remote diagnostics device and for processing the data at least to the extent that a diagnostics report can be sent through the field bus to the desired control computer. This allows the remote diagnostics device to be implemented without any processing capacity and electronics needed for data analysis and field bus interfacing, whereby the device can be made very simple and inexpensive. Consequently, these devices can be arranged in connection with any processing devices having a field device supporting this feature in their vicinity. No field bus cabling of any kind is needed. Since the invention preferably employs existing processing capacity and electronics, a conventional intelligent field device in its simplest form only requires a receiver for the wireless link, and some re-programming. This is why the additional cost incurred by the field device of the invention is almost solely restricted to the price of the wireless receiver. A wireless link based on the Bluetooth technology, for example, will be most affordable. This allows all new intelligent field devices, in principle, to be provided with such a receiver, or at least with the required ability, whereby they are flexible to configure through the field bus, for example, to support nearby remote diagnostics devices.

In a preferred embodiment of the invention the field device carries out analysis of raw data received from the diagnostics device as much as possible. This means that processed diagnostics reports are only transmitted through the field bus, which reduces the load on the field bus. The field bus may send a diagnostics report at predetermined intervals, for example, in response to a request received from the control computer and/or when the diagnostics data indicate a need for servicing or abnormal function of a process device. On the other hand, in another preferred embodiment of the invention the field device forwards the diagnostics data substantially unprocessed, the processing being mainly restricted to rendering the diagnostics data to a format that can be transferred on the field bus.

The remote diagnostics device is probably often at such a location that it is not easy to provide the device with a fixed electric power supply. Since one of the objectives of the invention is to avoid additional cabling, it is typically not reasonable to use long cables to provide the electric power supply. The remote diagnostics device will therefore typically be battery-operated and/or it will generate the required electric energy locally. This is another reason why the minimal electronic circuitry provides a significant advantage in the remote diagnostics device of the invention. The electric energy may be generated in a conventional manner, using solar cells for example. However, in connection with a process device to be monitored, there usually appears mechanic energy which can be converted to electric energy. One example is kinetic energy, such as vibration. Also noise, i.e. variations in air pressure, can be converted to electric energy. Process devices are often provided with pneumatic or hydraulic controls, whereby the compressed air or hydraulic pressure in the piping involved can be used for producing electric energy. In a preferred embodiment of the invention the power source of the remote diagnostics device generally comprises an energy converter which converts mechanical energy of the process device, such as kinetic energy or noise, or the hydraulic pressure or compressed air supplied to the process device into electric energy which is used for providing the operating voltage of the diagnostics electronics and the transmitter part.

BRIEF DESCRIPTION OF THE DRAWINGS

In the following, the invention will be described with reference to the preferred embodiments and the accompanying drawings, in which FIG. 1 is a block diagram illustrating an automation system in which the invention can be applied;

FIG. 2 is a block diagram illustrating the architecture of a second automation system;

FIG. 3 is a block diagram illustrating a remote diagnostics module of the invention;

FIG. 4 is a block diagram illustrating a digital valve controller of the invention.

DESCRIPTION OF THE PREFERRED EMBODIMENTS

The present invention can be applied to all industrial processes, or the like, comprising intelligent field devices connected to a field bus. In this context, intelligent field devices refer to devices used in connection with any process or automated system, or the control thereof, which is to be monitored and which is capable of producing data describing, either directly or indirectly, the condition of the device, i.e. condition data. A typical example of this kind of an intelligent field device is a control valve provided with a valve controller.

FIG. 1 is a schematic block diagram illustrating a process automation system with a field device diagnostics system of the invention connected thereto. The automation system comprises control room programs and databases 11, and process control programs and an I/O part 12. The control and I/O part 12 is connected through HART-standard buses to intelligent field devices comprising control valves 14, 15 and 16 and valve controllers 14A, 15a and 16A. The valve controller may be for example ND 800 of Neles Automation. HART (Highway Addressable Remote Transducer) is based on the simultaneous transmission of digital data and a conventional analog 4 to 20 mA signal. HART enables bi-directional communication which allows intelligent field devices to be controlled and data to be read from them. The HART protocol complies with the reference model of the OSI (Open System Interconnection) protocol stack developed by the International Organization for Standardization (ISO). HART commands are transferred in layers 7 (application layers). A HART instruction set comprises general instructions that all field devices understand, and device-specific instructions producing functions restricted to a specific device (device type). The HART protocol allows for both point-to-point configuration, in which each field device and master unit are interconnected by a specific bus (wire pair), or a multidrop configuration, in which even 15 field devices are connected to one and the same field bus (wire pair). The HART protocol is described in greater detail for example in the publication *HART Field Communication Protocol: An Introduction for Users and Manufacturers, HART Communication Foundation,* 1995. The HART protocol has also been adopted as an industrial standard. However, it should be appreciated that the type of the field communication interface, i.e. the field bus and the protocol it employs, or the implementation thereof is not relevant to the present invention.

The condition of the field devices is monitored with a field device diagnostics system 10 according to the invention which collects data from the field devices. For this purpose, each field device 14, 15 and 16 is provided with a separate field bus connecting the field device to a conventional HART multiplexer 9, which is in turn connected through an RS-485 bus 8 to a PC 6 running on Windows 95/98 or Windows NT operating system, for example. The workstation 6 is also connected to the local area network LAN of the plant (which the workstation can use for communicating with the control room programs, for example). Remote diagnostics modules 1 of the invention, placed on top of pumps 2, for example, transmit diagnostics data over a Bluetooth link 17 to field devices 14A, as will be described in greater detail below. The pump 2 moves a material flow forward in piping 4. Reference numeral 3 designates the pump motor. The pump is, however, only one example of process devices in connection with which the remote diagnostics module can be used. The invention is suitable for diagnosing any devices, such as mixers, refiners, screens, drums and switches.

The workstation 6 comprises field device control monitoring software for collecting data from the intelligent field devices 14-16. This data collection is a fully automated operation where no human intervention is needed. The collected data can be used for analysing the condition of the device, and a message reporting the condition can be transmitted to another system, for example to other parts, such as a control room application display, of the plant automation system.

FIG. 2 illustrates, by way of example, the architecture of a second automation system based on the field bus. A number of computers, for example a control room computer 21, business computer 21, service department computer 23 and an Internet link 24 are connected to a high-speed (100 Mbps) Ethernet network with an Ethernet switch 20. A number of linking devices 25A, 25B and 25C are also connected to the Ethernet network, the linking devices connecting the network to H1 Fieldbus-type field bus blocks 27 of a rate of 31.25 kbps. Diverse intelligent field devices are connected to the field bus 27, such as transmitters 28A and 28B, or positioners 29A and 29B. Diagnostics modules 1 of the invention connected to the pumps 2 form a wireless link 17 with the positioners 29, for example.

It is to be noted, however, that the precise structure of the field bus, diagnostics system or automation system is not relevant to the basic idea of the invention, and the invention is not meant to be restricted to the above examples. The more detailed description given below will therefore be only restricted to the implementation and operation of the remote diagnostics module 1 and an intelligent field device, such as the positioner 29.

FIG. 3 is a schematic block diagram illustrating a remote diagnostics module of the invention. The diagnostics module 1 always comprises some kind of a device for measuring or monitoring a given characteristic, or characteristics, of a target device. The diagnostics equipment in question typically comprises a transducer of some kind. Monitoring and measuring of different characteristics of devices, such as changes in pressure, temperature, vibration frequency, etc. allows flaws, damage caused by wear, or mounting faults appearing in a device to be detected at a sufficient reliability. For example, most products have inherent vibration frequencies on the basis of which their condition can be concluded. The reason for this is that the devices comprise a plural number of separate parts which together form a complex vibration system. These frequencies are easily affected by even the slightest mechanical changes, and it is impossible to construct two individual products with exactly the same vibration frequencies. Consequently, by studying the characteristic vibration frequencies of devices it is easy to detect even the slightest changes in them, their wearing, damage caused to them, and similar faults. FIG. 3 shows a preferred embodiment of the invention which is provided with an accelerometer 31 to be attached to the side of a pump or some other device to be diagnosed. The accelerometer measures acceleration caused by the vibration of the pump and produces samples proportional to the frequency and amplitude of the vibration. Other typical transducers include a pressure transducer and a temperature transducer. From the point of view of the basic idea of the invention, the type of variable to be measured or the transducer or other device used in the measurement are irrelevant. The control unit 32 reads samples from the accelerometer 31 on a continuous basis, at suitable intervals, or on the basis of some other criteria, and transfers the samples to a wireless transmitter 33 for further transmission over the wireless link 17 to the field device. The transmitter 33 is preferably a transmitter based on Bluetooth technology. Bluetooth is defined in the standard "*Specification of the Bluetooth system, v1.0B, Dec. 1$^{st}$ 1999*" which is being developed by a group of companies to provide short-range radio frequency data transmission between different devices, such as wireless data transmission between a mobile station and a computer, or wireless data transmission between a computer and peripheral equipment, such as a printer. Bluetooth technology aims at high manufacturing volumes, whereby an individual Bluetooth transmitter/receiver component can be provided at a very low price. However, in principle the wireless transmitter 33 can be implemented in the form of any wireless radio or infra-red transmitter offering a range of coverage sufficient for the application concerned. In the simplest configuration of the remote diagnostics module 1, the sample data from the transducer 31 can be in a format suitable for the Bluetooth transmitter 33 as such, in which case the control unit 32 is not needed at all. If the control unit 32 is included, in the simplest alternative it may convert a sample signal from the accelerometer 31 to a format suitable for the Bluetooth transmitter 33 and/or carry out the coordination and timing of the transmission of the samples. In a more complicated case, the control unit 32 may also comprise diverse sample processing, or rough analysis even. Since the first preferred embodiment, however, aims at providing a remote diagnostics device which is as simple and affordable as possible and which consumes as little energy as possible, the control unit 32 is provided with small processing capacity. The Bluetooth transmitter 33 and the control unit 32 can be implemented for example by means of one Bluecore01 integrated circuit manufactured by Cambridge Silicon Ltd (CSR). Bluecore01 comprises both a Bluetooth transmitter and a 16-bit Risc processor.

The power source 34 produces the required operating voltage or voltages for the electronics of the remote diagnostics module. If the power source can be plugged to the mains voltage system at its location, it may be a conventional mains power supply unit. Mains voltage supply is typically not easily available at a module mounting site, and thus the diagnostics module must be battery-operated and/or it must produce the electric energy it needs by itself. A pump, for example, always vibrates when it is running. Similarly, a mixer, refiner or drum vibrates or causes noise when it is in operation. Vibration and noise represent forms of energy. Vibration (kinetic energy) can be converted to electric energy for example by arranging a magnet to move inside a coil by impact of the vibration, voltage being thereby induced into the coil. Voltage induced into the coil can be used for charging a battery or it may be charged into a capacitor. When the capacitor or battery has been charged to a sufficient level, the control unit 32 is activated and it reads from the accelerometer 31 measurement data relating to a fairly short period of time and transfers the data to the transmitter 33 for transmission as a Bluetooth packet to the field device. In other words, the diagnostics module "wakes up" always when the charge level of the capacitor or battery is sufficient. Correspondingly, noise can also be converted to electric energy by means of a microphone, for example. Piezoelectric crystals can also be used for generating voltage. In addition, many process devices that are to be monitored are coupled to a pneumatic or hydraulic piping, in which case electric energy can be produced from compressed air or hydraulic pressure by means of a mechanic generator, such as a turbine-type solution. Valves, for example, typically operate pneumatically on compressed air.

FIG. 4 illustrates the field device of the invention. In the example of FIG. 4, the functionality of the invention is implemented into an existing field device, such as a digital valve controller or positioner ND800. The digital valve controller comprises a pneumatic control part 42 which provides a pneumatic feed pressure through tubes C1 and C2 into a cylinder of an actuator 46, above and below a piston 460. If the pressure above the piston 460 increases, the piston moves downward, and vice versa. The movement of the piston, in turn, changes the valve opening. On the basis of the piston movement, a signal proportional to the valve position can be generated with a transducer 431. The digital valve controller further comprises an electric control part 43 built around a microprocessor 430. In addition, the digital valve controller comprises a bus interface 44 connecting the controller to a 40–20 mA HART bus 45 leading to the multiplexer 18, for example, as illustrated in FIG. 1. The bus 45 may also be another kind of bus, such as a Foundation Fieldbus. A conventional digital valve controller receives the control through the HART bus into a bus interface 44 from where the microprocessor 430 reads the control data. On the basis of this, the microprocessor 430 then generates control signals for the pneumatic control 42. The microprocessor 430 also makes it possible to construct diverse diagnostics characteristics inside the valve controller. For example, the microprocessor 430 may carry out real-time monitoring by collecting diagnostics data and detecting deviations, if any, from accepted performance values. The digital valve controller thus has, already in its current form, both all the electronics and processing capacity needed for interfacing with a field bus and data processing capacity for analysing and reporting diagnostics data. In the embodiment of FIG. 4 the only additional component that is needed in the current digital valve controller ND800 is a wireless receiver circuit 41, such as a Bluetooth receiver component (for example Bluecore01, Cambridge Silicon Radio Ltd). The receiver 41 receives the diagnostics data over the wireless link 17 from the remote diagnostics module 1. The microprocessor 430 reads the received diagnostics data from the receiver 41 through a line or the bus 47. The microprocessor 430 stores the diagnostics data into a memory and analyses them. In the preferred embodiment of the invention, the microprocessor 430 carries out as much diagnostics data analysis as possible. The microprocessor 430 then transmits only processed diagnostics reports to a control computer 6 (FIG. 1), for example, over the bus interface 44 and field bus 45. For example, the microprocessor 430 may send the diagnostics report at predetermined intervals, in response to a request from the control computer and/or when the analysis shows that the monitored device needs to be serviced or that it functions abnormally.

In the preferred embodiment of the invention, the analysis of the diagnostics data carried out by the microprocessor 430 is based on the TESPAR (Time Encoded Signal Processing and Recognition) method. TESPAR is a modern signal analysis method utilizing a precise description of waveforms in the time domain, which description is based on polynomial theory and the location of zeros. The TESPAR allows samples provided by the accelerometer, for example, to be subjected to a kind of a statistical processing to produce for example a one-dimensional or two-dimensional histogram or matrix illustrating the operation of the device in a given situation. The matrix thus provides a kind of a fingerprint identifying the device. Any changes in the operation of the device, caused by malfunction for example, also change the vibration frequency of the device, and thereby the TESPAR matrix. A comparison between the TESPAR matrix based on the measured diagnostics data and the stored TESPAR matrix of an appropriately functioning device allows the malfunctioning or need for servicing of the device to be detected. In FIG. 3 the microprocessor 430 calculates TESPAR matrices from the received diagnostics data, and the matrices are then compared with the matrices stored in the memory. If the comparison shows that the monitored device needs to be serviced, or that it functions abnormally, the microprocessor 430 sends a notification to the control computer 6 through the field bus 45. This service notification may also contain the current TESPAR matrix, for example. In addition, the microprocessor 430 may send the TESPAR matrix to the control computer 6 at suitable intervals, or when the computer 6 requests for it. The TESPAR method is described in article "*Time for TESPAR*", Condition Monitor No 105, pp. 6 to 8.

A digital valve controller equipped with a Bluetooth receiver and a basic program supporting it allows the microprocessor 430 to be easily configured through the field bus 45 to operate according to the invention. In a field-bus-based system, the functionality of the field devices is typically described by means of function blocks. For example, in FIG. 4 the microprocessor 430 comprises a separate pneumatic control and actuator 46 function block, i.e. a kind of a parameter definition. Foundation Fieldbus, for example, has determined about 60 standard function blocks. Equipment manufacturers may also define function blocks of their own, provided that they conform to the general Fieldbus Foundation specification. A proprietary function block, DIAG_MODULE, supporting four remote diagnostics modules 1 of the invention could comprise for example the following parameters. Module 1 is attached to a pump and module 2 to a mixer.

| | |
|---|---|
| NR_OF_CONNECTED_DIAG_MODULES | "4" |
| MODULE_1.DEVICE_TAG | "Pump_001" |
| MODULE_1.DEVICE_STATUS | "OK / warning / alarm" |
| MODULE_1.LAST_RECEIVED_PACKET.VALUE | "0x0BA7FAEF" |
| MODULE_1.LAST_RECEIVED_PACKET.TIME_STAMP | "21/03/2000/16:35:001" |
| MODULE_4.TESPAR_SETTINGS | |
| MODULE_2.DEVICE TAG | "Mixer_001" |
| MODULE_2.DEVICE_STATUS | "OK" / warning / alarm" |
| MODULE_2.LAST_RECEIVED_PACKET.VALUE | "0x0BA7FAEF" |
| MODULE_2.LAST_RECEIVED_PACKET.TIME_STAMP | "21/03/2000/17:37:003" |
| MODULE_2.TESPAR_SETTINGS | |
| MODULE_3 . . . | |

With this kind of a function block, the field device, such as a digital valve controller, can be easily configured to support any remote diagnostics module and a device monitored by it. If there is a wireless link 17 connecting a plural number of remote diagnostics modules to the field device, each remote diagnostics module is provided with separate definitions.

The invention and its embodiments are not restricted to the above example, but they may vary within the scope of the claims.

The invention claimed is:

1. A system for diagnosing a process device, the system comprising
at least one control computer (6, 23) collecting diagnostics data relating to the process device (2, 14, 15, 16);
a field bus (27, 45);
field devices (14A, 15A, 16A, 18A, 28A, 28B, 29A, 29B) which comprise a control unit (430) and a field bus interface (44) for interfacing with the field bus (45) and for communicating with said at least one control computer over the field bus, characterized in that the system further comprises
a remote diagnostics device (1) which is placed in connection with the process device (2) separate from the field devices and which comprises diagnostics electronics (31) collecting diagnostics data relating to the process device, and a transmitter part (33) for wireless (17) transmission of the diagnostics data to one of said field devices, and that
said one field device comprises a receiver part (41) for wireless (17) reception of the diagnostics data from said remote diagnostics device (1), said control unit (430) being arranged to process the received diagnostics data and to transmit a diagnostics report over said field bus interface (44) and field bus to said control computer (6, 27).

2. A system according to claim 1, characterized in that the diagnostics data sent by the remote diagnostics device (1) substantially consists of raw data, and that the field device is arranged to store and analyse the received diagnostics data to produce a processed diagnostics report.

3. A system according to claim 1 or 2, characterized in that the field device sends the diagnostics data at predetermined intervals, in response to a request from the control computer and/or when the diagnostics data show that the process device requires servicing or that it functions abnormally.

4. A system according to any one of the preceding claims, characterized in that the field device forwards the diagnostics data in a substantially non-analysed form.

5. A system according to any one of the preceding claims, charactrized in that the field device can be configured to perform wireless reception of diagnostics data from two or more remote diagnostics devices (1), and to process the received data.

6. A system according to any one of the preceding claims, characterized in that the wireless transmission between the remote diagnostics device (1) and the field device is based on Bluetooth technology or a similar short-range wireless transmission technology.

7. A field device in a process automation system, the device comprising a control unit (430) and a field bus interface (44) for interfacing with a field bus (27, 45) of the process automation system and for communicating with at least one control computer (6, 23) over the field bus, characterized in that the field device (14A, 15A, 16A, 18A, 28A, 28B, 29A, 29B) comprises a receiver part (41) for wireless (17) reception of diagnostics data from a remote diagnostics device (1) placed separate from the field device for collecting diagnostics data of relating to a second process device (2), and that the control unit (430) is arranged to process the received diagnostics data and to transmit a diagnostics report over said field bus interface (44) and field bus (27, 45) to said control computer.

8. A field device according to claim 7, characterized in that the diagnostics data received from the remote diagnostics device (1) substantially consists of raw data, and that the field device is arranged to store and analyse the received diagnostics data to allow a processed diagnostics report to be produced.

9. A field device according to claim 6 or 7, characterized in that the field device sends the diagnostics report at predetermined intervals, in response to a request from the control computer and/or when the diagnostics data show that the process device (2) requires servicing or that it functions abnormally.

10. A field device according to any one of claims 7 to 9, characterized in that the field device forwards the diagnostics data in a substantially non-analysed form.

11. A field device according to any one of claims 7 to 10, characterized in that the field device can be configured to perform wireless reception of diagnostics data from two or more remote diagnostics devices (1), and to process the data.

12. A field device according to any one of claims 7 to 11, characterized in that the wireless transmission (17) between the remote diagnostics device and the field device is based on Bluetooth technology or a similar short-range wireless transmission technology.

13. A diagnostics device for a process device in a process automation system in which field devices (14A, 15A, 16A, 18A, 28A, 29A, 29B) communicate over a field bus (27, 45), characterized in that the diagnostics device (1) is a remote diagnostics device meant to be placed separate from the field bus (27, 45) in connection with the process device (2), the remote diagnostics device comprising
diagnostics electronics (31) collecting diagnostics data relating to the process device (2),
a transmitter part (33) for wireless transmission of the diagnostics data to one of said field devices connected to the field bus (27, 45).

14. A diagnostics device according to claim 13, characterized in that the diagnostics data sent by the diagnostics device (1) substantially consists of raw data which is analysed in the field device or elsewhere in the process automation system.

15. A diagnostics device according to claim 13 or 14, characterized in that the power source (34) of the diagnostics device (1) comprises an energy converter which converts the mechanic energy, such as kinetic energy or noise, of the process device, or the energy of hydraulic pressure or compressed air supplied to the process device, into electric energy to be used for generating operating voltage for the diagnostics electronics (31) and the transmitter part (33).

* * * * *

UNITED STATES PATENT AND TRADEMARK OFFICE
CERTIFICATE OF CORRECTION

PATENT NO. : 7,058,542 B2
APPLICATION NO. : 10/332165
DATED : June 6, 2006
INVENTOR(S) : Hauhia et al.

It is certified that error appears in the above-identified patent and that said Letters Patent is hereby corrected as shown below:

Column 9 and 10,
Claims 1-15 delete and insert:

--1. A system for diagnosing a process device, the system comprising
at least one control computer collecting diagnostics data relating to the process device;
a field bus;
field devices which comprise a control unit and a field bus interface for interfacing with the field bus and for communicating with said at least one control computer over the field bus,
a remote diagnostics device which is placed in connection with the process device separate from the field devices and which comprises diagnostics electronics collecting diagnostics data relating to the process device, and a transmitter part for wireless transmission of the diagnostics data to one of said field devices, and
said one field device comprises a receiver part for wireless reception of the diagnostics data from said remote diagnostics device, said control unit being arranged to process the received diagnostics data and to transmit a diagnostics report over said field bus interface and field bus to said control computer.

2. A system according to claim 1, wherein the diagnostics data sent by the remote diagnostics device substantially consists of raw data, and wherein the field device is configured to store and analyse the received diagnostics data to produce a processed diagnostics report.

3. A system according to claim 1 or 2, wherein the field device is configured to send the diagnostics data at predetermined intervals, in response to a request from the control computer and/or when the diagnostics data indicate that the process device requires servicing or that it functions abnormally.

4. A system according to claim 1, wherein the field device is configured to forward the diagnostics data in a substantially non-analysed form.

5. A system according to claim 1, wherein the field device can be configured to perform wireless reception of diagnostics data from two or more remote diagnostics devices, and to process the received data.

6. A system according to claim 1, wherein the wireless transmission between the remote diagnostics device and the field device is based on Bluetooth technology or a similar short-range wireless transmission technology.

UNITED STATES PATENT AND TRADEMARK OFFICE
CERTIFICATE OF CORRECTION

PATENT NO. : 7,058,542 B2
APPLICATION NO. : 10/332165
DATED : June 6, 2006
INVENTOR(S) : Hauhia et al.

It is certified that error appears in the above-identified patent and that said Letters Patent is hereby corrected as shown below:

Column 9 and 10, delete and insert:

7. A field device in a process automation system, the device comprising a control unit,
a field bus interface for interfacing with a field bus of the process automation system and for communicating with at least one control computer over the field bus,
a receiver part for wireless reception of diagnostics data from a remote diagnostics device placed separate from the field device for collecting diagnostics data of relating to a second process device, and
the control unit being arranged to process the received diagnostics data and to transmit a diagnostics report over said field bus interface and field bus to said control computer.

8. A field device according to claim 7, wherein the diagnostics data received from the remote diagnostics device substantially consists of raw data, and wherein the field device is arranged to store and analyse the received diagnostics data to allow a processed diagnostics report to be produced.

9. A field device according to claim 6 or 7, wherein the field device sends the diagnostics report at predetermined intervals, in response to a request from the control computer and/or when the diagnostics data show that the process device requires servicing or that it functions abnormally.

10. A field device according to claim 7, wherein the field device forwards the diagnostics data in a substantially non-analysed form.

11. A field device according to claim 7, wherein the field device can be configured to perform wireless reception of diagnostics data from two or more remote diagnostics devices, and to process the data.

12. A field device according to claim 7, wherein the wireless transmission between the remote diagnostics device and the field device is based on Bluetooth technology or a similar short-range wireless transmission technology.

13. A diagnostics device for a process device in a process automation system in which field devices communicate over a field bus, wherein the diagnostics device is a remote diagnostics device meant to be placed separate from the field bus in connection with the process device, the remote diagnostics device comprising diagnostics electronics collecting diagnostics data relating to the process device,
a transmitter part for wireless transmission of the diagnostics data to one of said

UNITED STATES PATENT AND TRADEMARK OFFICE
CERTIFICATE OF CORRECTION

| | |
|---|---|
| PATENT NO. | : 7,058,542 B2 |
| APPLICATION NO. | : 10/332165 |
| DATED | : June 6, 2006 |
| INVENTOR(S) | : Hauhia et al. |

It is certified that error appears in the above-identified patent and that said Letters Patent is hereby corrected as shown below:

field devices connected to the field bus.
<u>Column 9 and 10,</u> delete and insert:

14.    A diagnostics device according to claim 13, wherein the diagnostics data sent by the diagnostics device substantially consists of raw data which is analysed in the field device or elsewhere in the process automation system.

15.    A diagnostics device according to claim 13 or 14, wherein the power source of the diagnostics device comprises an energy converter which converts the mechanic energy, such as kinetic energy or noise, of the process device, or the energy of hydraulic pressure or compressed air supplied to the process device, into electric energy to be used for generating operating voltage for the diagnostics electronics and the transmitter part.--.

Signed and Sealed this

Second Day of January, 2007

JON W. DUDAS
*Director of the United States Patent and Trademark Office*